US005948026A

United States Patent [19]

Beemer, II. et al.

[11] Patent Number: 5,948,026

[45] Date of Patent: Sep. 7, 1999

[54] AUTOMOTIVE DATA RECORDER

[75] Inventors: Delbert Gerald Beemer, II., Fenton; Paul Stephen Zombory, Northville; Steven Douglas Stiles, Clarkston; Vivek Mehta, Holly; Liu Hong, Rochester Hills, all of Mich.

[73] Assignee: General Motors Corporation, Detroit, Mich.

[21] Appl. No.: 08/736,178

[22] Filed: Oct. 24, 1996

[51] Int. Cl.[6] ........ G06F 7/00

[52] U.S. Cl. ........ 701/35; 701/29; 701/34; 701/115

[58] Field of Search ........ 701/1, 8, 29, 33, 701/34, 35, 31, 102, 110, 114, 115, 70, 79

[56] References Cited

U.S. PATENT DOCUMENTS

| | | | |
|---|---|---|---|
| 5,050,080 | 9/1991 | Abe | 701/35 |
| 5,276,619 | 1/1994 | Ohara et al. | 701/35 |
| 5,305,216 | 4/1994 | Okura et al. | 701/35 |
| 5,311,430 | 5/1994 | Ishigami | 701/35 |
| 5,388,045 | 2/1995 | Kamiya et al. | 701/35 |
| 5,546,306 | 8/1996 | Hirabayashi et al. | 701/35 |
| 5,752,211 | 5/1998 | Takasaki et al. | 701/69 |

*Primary Examiner*—William A. Cuchlinski, Jr.
*Assistant Examiner*—Gertrude Arthur
*Attorney, Agent, or Firm*—Michael J. Bridges

[57] ABSTRACT

A multiple state automotive data storage and analysis procedure in which vehicle operating parameters are continuously logged in a first state while monitoring the vehicle operating condition for occurrence of any of a predetermined set of trigger conditions. Upon occurrence of any of the predetermined set of trigger conditions, logging operations are suspended and confirmation of occurrence of any of a predetermined set of storage conditions occurs in a second state. If such occurrence is confirmed, a third state is entered in which the logged parameter values are transferred to more permanent memory devices for off-line analysis thereof. If such occurrence is not confirmed, operations of the first state are resumed.

14 Claims, 4 Drawing Sheets

AUTOMOTIVE DATA RECORDER

FIELD OF THE INVENTION

This invention relates to automotive data storage and analysis and, more particularly, to a method and apparatus for analyzing and storing automotive vehicle parameter values indicating state of operation of an automotive vehicle.

BACKGROUND OF THE INVENTION

Sophisticated automotive controllers are commercially available that process vehicle operator controlled input information into control signals issued to various automotive control actuators. The input information and the issued control signals provide valuable information describing vehicle operator behavior and the vehicle response to such behavior. It therefore would be desirable to retain such information, for example through controller interaction with on-board data storage devices.

The cost of such storage devices and the voluminous information processed by the controller limit the amount of such information that can retained. Most of the processed information is of liitle or no value and can be discarded. However, under certain driving conditions or preceding certain events the information may be valuable and it would therefore further be desirable to selectively retain processed input and control information at specific times during vehicle operation.

SUMMARY OF THE INVENTION

The present invention is directed to a desirable on-board data recorder which selectively stores certain vehicle data following detected vehicle operating events.

More specifically, vehicle operating conditions, are categorized as trigger conditions. Vehicle operating parameter patterns characteristic of such trigger conditions are identified and stored in controller memory devices. Vehicle operating parameters are continuously monitored and stored in temporary storage devices. Periodically, the parameters are monitored and compared to the patterns characteristic of the trigger conditions. If a pattern substantially matches a pattern characteristic of a trigger condition, data storage operations are suspended and a procedure is initiated to confirm that a relevant vehicle operating condition has occurred. If no such confirmation can be made, data storage operations are resumed. If such confirmation can be made, the stored data is transferred to more permanent storage devices, such as flash memory or electrically erasable read only memory devices (EEPROM). The stored. parameters are then available for analysis for an extended period of time, including an extended period of time when the controller is deactivated.

In accord with a further aspect of this invention, the trigger conditions correspond to conditions indicating the vehicle is operating in an undesirable manner. In accord with yet a further aspect of this invention, the confirmation occurs if a condition occurs that would likely follow from undesirable vehicle operation, such as a fault condition or a shutdown condition.

In accord with a further aspect of this invention, a memory device having a limited number of storage locations is allocated for temporary storage of the parameters. Storage of new parameters is provided for in a “first in, first out” memory allocation scheme in which, to make room for new parameter values that are to be stored, the oldest stored parameter values are discarded to ensure storage of the most up-to-date parameter information. In accord with yet a further aspect of this invention, occurrence of a second trigger condition following storage in the more permanent storage devices initiates an overwrite operation in which the parameter values stored in the more permanent storage devices are overwritten by the values stored in the temporary storage devices. Still further, additional flash memory or EEPROM may be allocated for storing the parameter values upon detecting additional trigger conditions to maximize retention of relevant parameter information.

In accord with yet a further aspect of this invention, the vehicle operating parameter patterns characteristic of the trigger conditions vary as a function of certain parameter values representative of the vehicle operating state. As the operating state of the vehicle varies, the trigger conditions vary so that only when relevant operating conditions are present in the context of the current operating state of the vehicle will the trigger conditions be met. The storage of the data in more permanent memory devices is thereby selective, to reduce the potential that irrelevant information may be recorded and valuable information not recorded.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
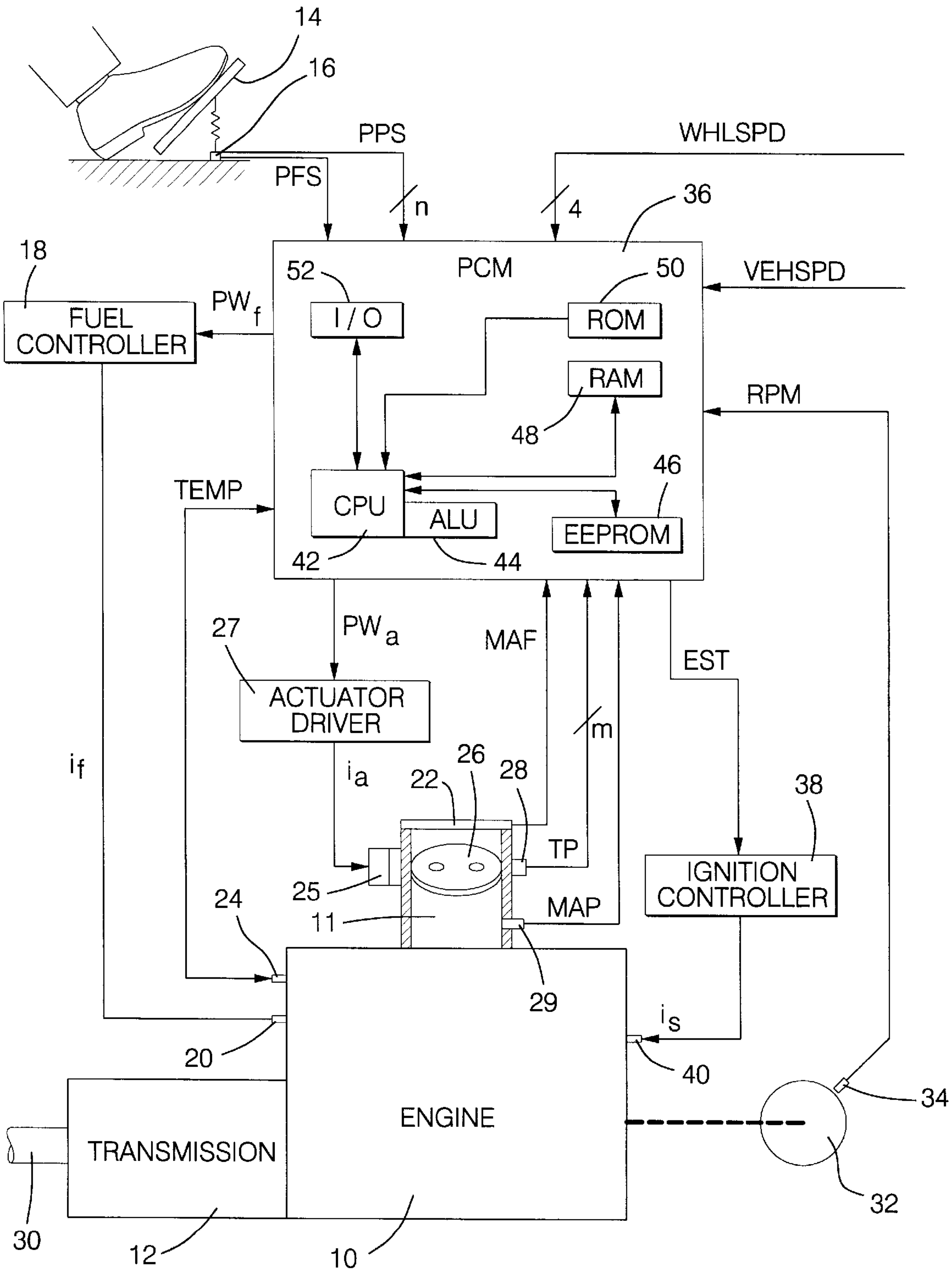
FIG. 1 is a general powertrain diagram with data recording hardware in accord with the preferred embodiment of this invention.

Referring to FIG. 1, automotive vehicle powertrain includes schematically illustrated internal combustion engine 10 mechanically linked to transmission 12 having transmission output shaft 30 mechanically coupled to driven vehicle wheels (not shown). The engine receives intake air through intake air bore 13 in which is rotatably disposed intake air valve 26 of the rotary or butterfly type, the angular position of which is manually controlled by a vehicle operator or is electronically controlled by an electronic throttle control (ETC) system in which a current command $i_a$ issued by an actuator driver 27 is applied to a rotary actuator 25, such as a conventional step motor or DC motor having an output shaft linked to the valve 26 to rotate the valve to a position providing a desired degree of restriction to intake air passing through the bore 13.

The rotational position of the valve 26 is transduced by rotary displacement sensor 28 of any conventional type such as a redundant potentiometric position sensor having “m” redundant conventional transducer circuits each providing substantially an independent output signal indicating angular displacement of the valve 26 away from a rest position. For example, the redundant position sensing hardware elements 40 and 42 of FIG. 1 of copending U.S. patent application Ser. No. 08/361,089, filed Dec. 21, 1994, providing a pair of substantially independent valve position output signals may be provided as sensor 28 of FIG. 1 in which “m” is set to two.

Intake air passing the valve 26 is received in intake manifold 11 for distribution to engine cylinders (not shown).

Intake manifold absolute air pressure is transduced by pressure sensor 29 of a conventional type into output signal MAP. Engine coolant is circulated through a standard circulation system in which is disposed temperature sensor 24 in the form of a conventional thermocouple or thermistor for transducing coolant temperature into output signal Te. Accelerator pedal 14 is manually depressed away from a rest position by a vehicle operator indicating a desired engine operating level, such as a desired engine output torque level. The degree of pedal depression away from a rest position is transduced by circuitry included within sensor circuit 16 which may include "n" redundant position transducers of the potentiometric type having a corresponding "n" substantially redundant output signals indicating the pedal displacement.

The sensor circuit 16 further may include a pedal force switch (not shown) having binary output signal PFS set to a low voltage level in the absence of substantial displacement of the pedal 14 away from said rest position and otherwise set to a high voltage output level. For example, the "n" substantially redundant pedal position sensors may take the form of sensors 20, 22, and 24 of FIGS. 1 and 2 of copending U.S. patent application Ser. No. 08/361,089, filed Dec. 21, 1994 in which "n" is set to three.

Up to four vehicle wheels speed sensors (not shown), for example of the Hall effect or variable reluctance type, are provided for transducing rate of rotation of vehicle wheels into up to four corresponding output signals WHLSPD. Additionally, a vehicle speed signal VEHSPD is provided such as may be resolved from an averaging of wheel speed of undriven vehicle wheels or as a function of the rate of rotation of transmission output shaft 30 using standard rotational speed sensors (not shown).

The intake air is combined with an injected quantity of fuel and is delivered for combustion in engine cylinders (not shown) for reciprocally driving pistons within the cylinders, the pistons being mechanically linked to an engine output shaft 32, such as a crankshaft, to rotate the engine output shaft which may be linked through a torque converter mechanism (not shown) to the transmission 12 for driving the transmission in a manner well-understood in the art. A sensor 34, which is of the Hall effect, variable reluctance or magnetoresistive type, is fixedly disposed relative to the output shaft 32 in proximity to the teeth or notches thereon to transduce passage of the teeth or notches into sensor output signal RPM, the frequency of which signal is proportional to engine speed.

A powertrain control module PCM 36 includes such conventional elements as a central processing unit CPU 42 having an arithmetic logic unit ALU 44 for carrying out arithmetic and logic functions, an input/output unit I/O 52 for managing passage of data between the CPU 42 and external sensors, transducers and indicators, and various well-known memory devices including read only memory devices ROM 50 for permanent data storage including storage of the steps making up various control, diagnostic, and maintenance routines, random access memory RAM 48 for temporary data storage, and more permanent memory devices, such as electronically erasable programmable read only memory devices EEPROM 46 or conventional flash memory devices for long term read and write storage functions.

The PCM 36 is electrically energized by ignition power manually applied by a vehicle operator, such as through manual rotation of an ignition cylinder to an "ON" position. When energized, the PCM 36 reads a plurality of control, diagnostic, and maintenance routines from ROM 50 and executes, on an instruction-by instruction basis, the operations of such routines. Included in such routines are routines to read current engine parameter values, as indicated by PCM input signals PPS, PFS, TEMP, MAF, TP, MAP, RPM, VEHSPD, and WHLSPD, and to generate and issue control signals to various actuators and indicators. For example, conventional fuel control operations are periodically carried out, such as prior to each engine cylinder expansion stroke, to generate a fueling command in the form of a pulsewidth $PW_f$ the duration of which indicates a desired fuel injector open time during which open time pressurized fuel is admitted by a fuel injector 20 into an intake runner of an active engine cylinder, as is generally understood in the art. The command $PW_f$ is issued to a fuel controller 18 for generating a corresponding current command $i_f$ issued to an active injector 20 to drive the injector to an open orientation for the duration of $PW_f$.

The control operations further include operations for generating a desired intake air valve rotational position and issuing a command $PW_a$ to actuator driver 27 which takes the form of a conventional H bridge current driver for applying drive current $i_a$ to the actuator 25. The command $PW_a$ may be determined as a function of the n PPS signals and other values indicating the state of certain engine control operations, such as idle speed control, traction control, or cruise control operations which influence a desired intake air valve position. The duty cycle of PWa is substantially proportional to a desired degree of rotation of the intake air valve away from a rest position.

Still further, the control operations include ignition timing operations for controlling the timing of ignition of the air/fuel mixture in the engine cylinders to vary engine output torque as a function of engine operating conditions, wherein a desired timing command EST is issued to an ignition controller 38 which times issuance of ignition control current signal $i_s$ to an active engine cylinder to time the ignition of the air/fuel mixture therein, as is generally understood in the art.

In this embodiment, routines may be repeatedly executed while the PCM is active, with individual control, diagnostic and maintenance operations of such routines initiated following enabled timer and event based PCM interrupts, as is generally understood in the art. Included with such interrupts is a timer interrupt enabled to occur about every 18.75 milliseconds while the PCM 36 is operating. Upon occurrence of such interrupt, the CPU 42 automatically references an interrupt vector from ROM 50 indicating the starting point of a service routine to service the interrupt.

Figure 2:
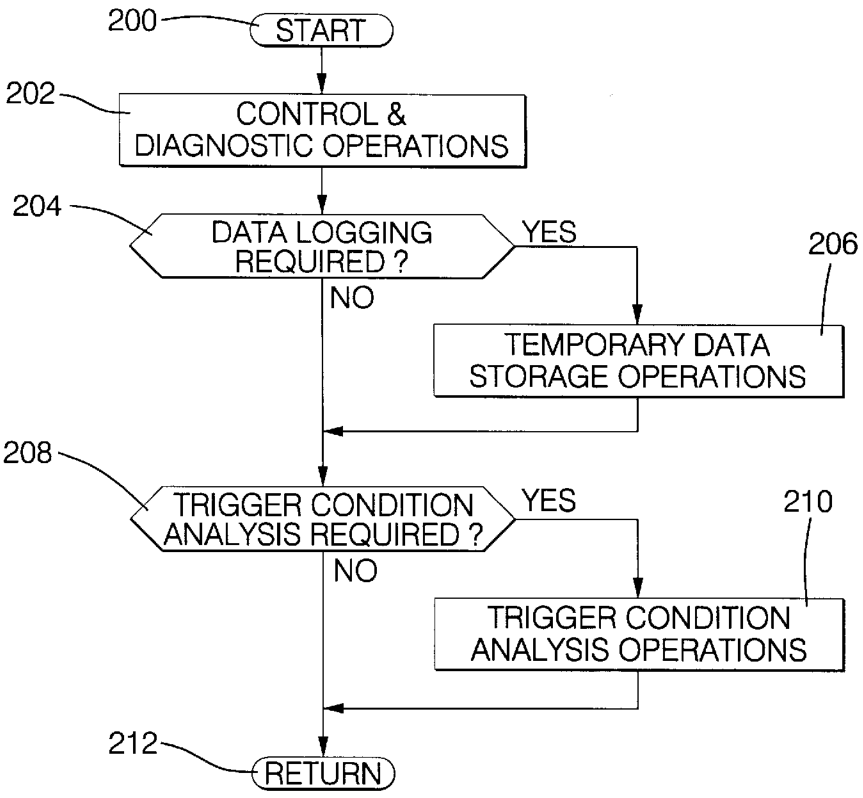
FIGS. 2–5 are computer flow diagrams illustrating a flow of data recording operations of the hardware of FIG. 1.
Figure 3:
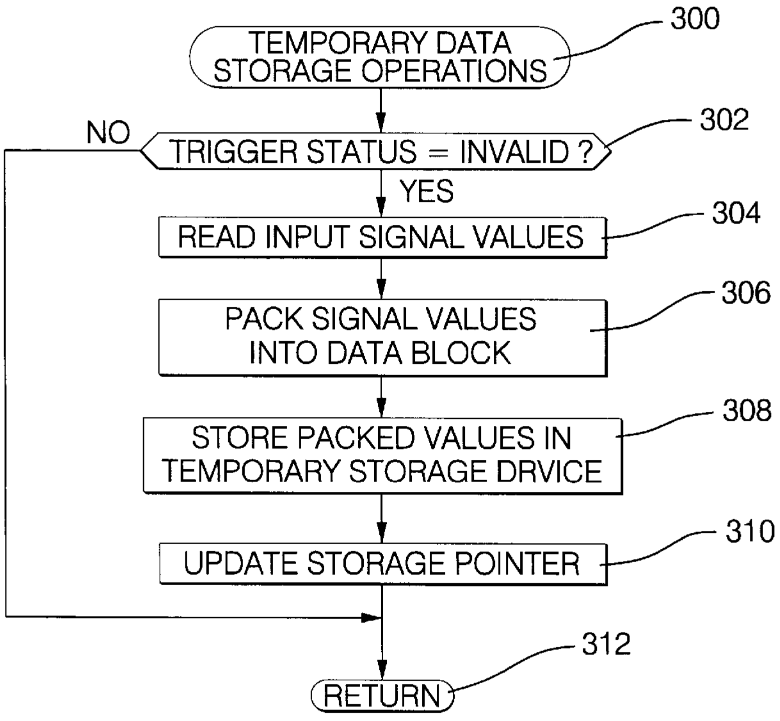
Figure 4:
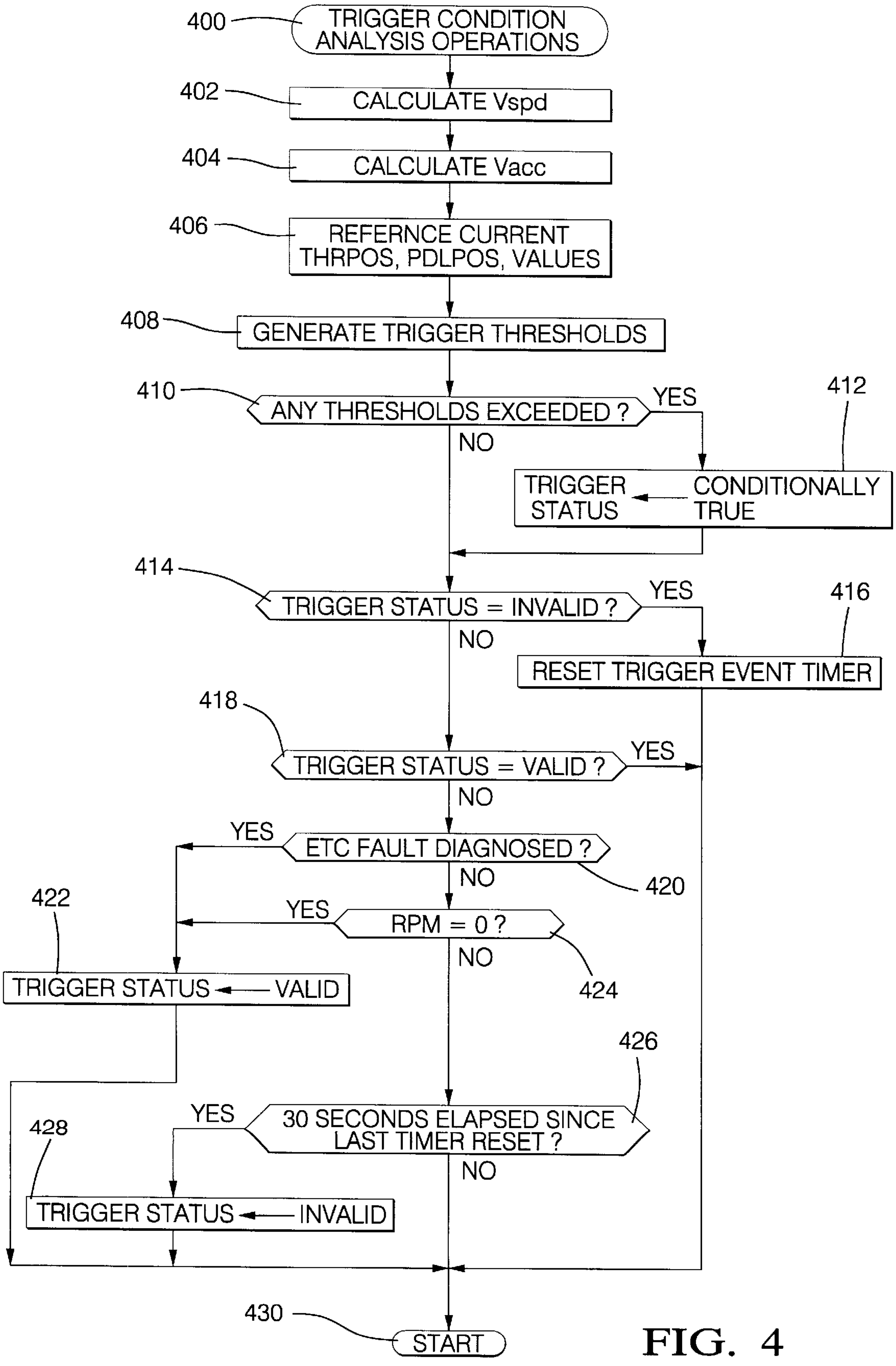

Such interrupt service routine includes a series of instructions which are executed in an instruction-by-instruction format for carrying out the operations generally illustrated in FIGS. 2–4, beginning at a step 200 of the operations of FIG. 2 and proceeding to carry out any control and diagnostic operations, including engine intake air valve control operations for varying the position of valve 26 of FIG. 1 in response to, among other inputs, a sensed degree of depression of pedal 14 away from a rest position, as described. Such control and diagnostic operations may take the form of any conventionally-known control and diagnostic operations. Following completion of such operations, data storage operations in accord with this invention are carried out.

Generally, such data storage operations provide for a three state data analysis and storage procedure. In a first state, termed an "active" state, relevant data is periodically packed and stored into a reserved area of a volatile memory device.

The reserved area is of a limited size. When the reserved area is filled with such data, the oldest data is overwritten. A record of most recent relevant vehicle data is thereby maintained at all times while the vehicle is operating. While such storage operations of the active state are going on, repeated checks are made for occurrence of trigger conditions which are generally any conditions indicating that the stored data may be required for analysis of vehicle operation.

If any of such trigger conditions occur, a second state is entered, termed the "suspended" state. In the suspended state, data storage operations are suspended and a confirmation procedure for confirming that the stored data indeed will be required is carried out. The confirmation procedure monitors vehicle operating conditions to determine whether the operating state of the vehicle has changed in a manner indicating a failure condition. If such condition is determined to have occurred, a third state is entered, termed the "terminated" state in which the stored data is transferred, as soon as convenient and before any significant chance of data loss, to more permanent memory devices so that it may be available for analysis for a substantial period of time including a time after the vehicle is no longer being operated. In the "terminated state" the operations of both the active and suspended states, including data storage operations, may be discontinued to ensure no loss of the stored data.

Alternatively, upon completion of the data transfer to more permanent memory devices, the active state may be resumed. In the event the operations of the suspended state establish that no failure condition has occurred, the active state is resumed and data storage operations continue in the described manner. In this manner, the limited memory storage capacity typical of automotive vehicles is efficiently put to use securely record up-to-date relevant operating data, and the critical "permanent" memory devices are only put to use to store the data following confirmation that certain vehicle operating events have occurred.

Returning to FIG. 2, such described data storage operations are carried out by, following the described step 202, proceeding to determine if data logging operations are currently required at a next step 204. In this embodiment, data logging operations are required periodically. In other embodiments within this invention, data logging operations may be required synchronous with engine operating events, such as following a predetermined number of engine cylinder events. Returning to this embodiment, data logging operations are required once for every six times step 204 is executed.

If data logging operations are determined to be required, temporary data storage operations are executed at a next step 206, by proceeding to the operations of FIG. 3 beginning at a step 300 and proceeding to check a stored trigger status at a next step 302. Trigger status is the status of conditions used to transfer between the data analysis and storage states of this embodiment. Trigger status includes an "invalid" status in which no valid trigger condition has been detected, a "conditionally true" status in which a trigger condition may have occurred but requires confirmation, and a "valid" status in which a trigger condition has been confirmed. If trigger status is "invalid," then a set of data indicating current engine parameter information is stored at steps 304–310. It should be pointed out that, in this embodiment, trigger status is initialized upon application of ignition power to the PCM 36 of FIG. 1, to "invalid."

Specifically, input signal values, which may include any automotive vehicle parameter values, whether directly measured using a sensor or transducer, or whether indirectly estimated or predicted, are read at a next step 304. In this embodiment, such signal values include values of the described signals PPS, PFS, WHLSPD, VEHSPD, RPM, MAP, MAF, TP, TEMP, each of which may have redundant values. The read input signal values are next packed, through execution of any commercially available data storage packing procedure, into a block of data requiring minimum storage area in RAM 48 at a next step 306.

For example, un-informational data bytes or words may be removed from the data and the data compacted into a minimum size data block at the step 306, to maximize the amount of data that may be stored into the area of memory allocated for use for the data storage operations of this embodiment. The packed data is next stored in a temporary storage device at a step 308, such as conventional RAM device 48 of FIG. 1. This provides temporary, high reliability storage of data until it can be determined whether the data should be transferred to more permanent storage devices, as will be described.

After storing the block of packed data at the step 308, a pointer, for pointing to a next available block of the memory device that has been allocated for use in the data storage operations of FIG. 3, is updated at a step 310 to point to a next available block of volatile memory. As described, block after block of packed data are stored in series in a reserved block of volatile memory of limited size. The pointer points to the next available block. Once the reserved area is full, the pointer begins back at the first stored block and allows for the oldest data to be overwritten with any new block of packed data to be stored at the step 308.

After updating the pointer, or if the trigger status was not "invalid" at the step 302, the operations of FIG. 3 are complete and the CPU 42 (FIG. 1) returns, via a next step 312, to continue execution of the operations of FIG. 2 at a next step 208, which is also executed if it is determined that data logging operations are not required at the described step 204. A determination is made at the step 208 of whether trigger condition analysis is currently required. In this embodiment, trigger condition analysis provides for monitoring of vehicle operating conditions to determine whether a condition requiring permanent storage of the block of data may be required. Such analysis is carried out approximately every 37.5 milliseconds while the PCM 36 is operating which, in this embodiment, is every other iteration of the analysis of step 208.

If trigger condition analysis is determined to be required at the step 208, trigger condition analysis operations are next carried out at a step 210 by proceeding to the operations of FIG. 4, beginning at a step 400 and proceeding to calculate or read a vehicle speed value at a step 402. Vehicle speed may be calculated as a function of individual wheel speed values read at the described step 304, or as a function of transmission output shaft 30 (FIG. 1) output rate of rotation, or may be read as a filtered version of the described signal VEHSPD of FIG. 1. After determining vehicle speed, vehicle acceleration is determined at a next step 404, for example as a time rate of change in vehicle speed between the current vehicle speed and a predetermined plurality of prior determined vehicle speed values. Current throttle position and pedal position values are next referenced at a step 406, representing respectively the current position of the accelerator pedal 14 (FIG. 1) away from its rest position, and current position of the intake air valve 26 away from a rest position. Such current throttle and pedal position values may be resolved in any conventional manner providing for an accurate pedal and throttle position indication, such as through filtering of the plurality of redundant position input signals and averaging the filtered signals to arrive at one representative position indication.

A plurality of trigger thresholds are next determined at a step 408. The trigger thresholds are determined as a function of current vehicle operating conditions. The trigger thresholds represent levels of various vehicle operating conditions above which the conditions are of a nature requiring entry into the second data analysis and logging state, termed the suspended state, as described.

Figure 6A:
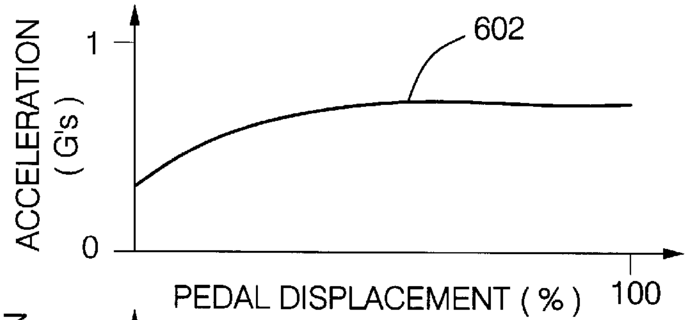
FIGS. 6A, 6B, and 6C are parameter diagrams illustrating calibrated relationships between vehicle parameter values and trigger thresholds referenced through the operations of the routines of FIGS. 2–5.

A first trigger threshold is a vehicle acceleration threshold as is determined in this embodiment as a function of the position of pedal 14 (FIG. 1) away from a rest position as illustrated by the curve 602 of FIG. 6A. Generally, curve 602 of FIG. 6A illustrates a representative calibration relationship between a vehicle acceleration threshold and pedal position, wherein the vehicle acceleration threshold varies in proportion to pedal displacement away from its rest position. For minor depression of the pedal 14, the acceleration threshold will be small. For substantial depression of the pedal 14, the acceleration threshold will be large.

Figure 6B:
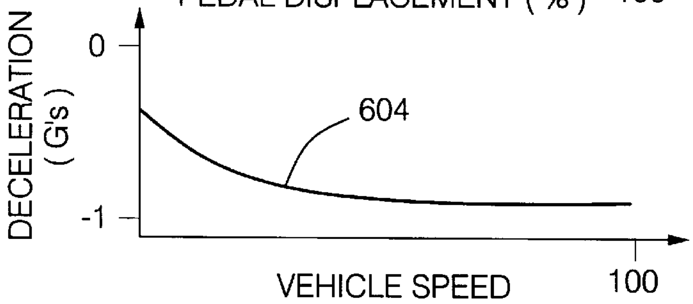

Generally, the acceleration threshold provides that a switch from the active to the suspended state will occur when vehicle acceleration is relatively large in proportion to the degree of depression of the pedal 14. The specific relationship between pedal displacement and acceleration threshold may be determined for a given vehicle application, through a calibration procedure responsive to vehicle acceleration conditions under which it would be desirable to provide for permanent storage of vehicle operating parameter data. A second trigger threshold is a vehicle deceleration threshold as is determined in this embodiment as a function proportional to vehicle speed as illustrated in curve 304 of FIG. 6B, which is a representative calibrated relationship between the deceleration threshold and vehicle speed. For low vehicle speed, the deceleration threshold of curve 604 is relatively small, whereas for high vehicle speed, the deceleration threshold of curve 604 is relatively large. Generally, the deceleration threshold provides that when relatively small vehicle deceleration occurs while traveling slowly, or when a relatively large vehicle deceleration occurs while traveling quickly the suspended state will be enabled. The specific relationship between vehicle speed and deceleration threshold may be determined for a given vehicle application, through a conventional calibration procedure responsive to vehicle deceleration conditions under which it would be desirable to provide for permanent storage of vehicle operating parameter data.

Figure 6C:
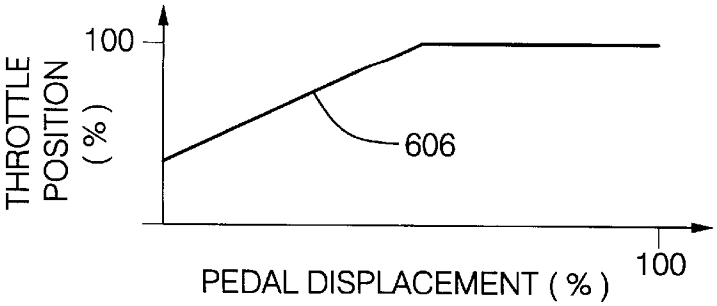

A third trigger threshold is a intake air valve (throttle) position threshold determined as a function proportional to the position of the pedal 14 (FIG. 1) away from a rest position as illustrated by curve 606 of FIG. 6C, which is a representative calibrated relationship between the throttle position threshold and pedal position. As illustrated by curve 606, for relatively small pedal depression, the throttle position threshold is relatively small, whereas for large pedal depression, the throttle position is relatively large. Generally, the throttle position threshold provides that when the opening of the intake air valve (throttle) 26 (FIG. 1) is large relative to the degree of depression of the pedal 14, the suspended state will be enabled. The specific relationship between pedal position and the throttle position threshold may be determined for a given vehicle application, through a conventional calibration procedure by evaluating the relationship between pedal and throttle position and the conditions under which it would be desirable to provide for permanent storage of vehicle operating parameter data.

The trigger thresholds may be stored, following calibration thereof, in ROM 50 (FIG. 1) in the form of schedules or lookup tables. Each schedule (or lookup table) includes indexed trigger threshold values. The indices are pedal position values for the acceleration and throttle position threshold schedules, and are vehicle speed values for the deceleration schedules. Alternatively, the trigger thresholds may be calculated by referencing stored calibrated functions describing calibrated relationships between vehicle operating parameters and corresponding threshold values, i.e. stored functions representing relationships such as those of curves 602, 604, and 606 of respective FIGS. 6A, 6B, and 6C. Te functions may be stored in ROM 50 (FIG. 1).

After determining the trigger thresholds, each threshold is compared to the current value of the corresponding vehicle operating parameter at a next step 410. Positive vehicle acceleration is compared to the acceleration trigger threshold, and if the acceleration is negative (deceleration), it is compared to the deceleration threshold, and throttle position is compared to the determined throttle position threshold. If the magnitude of any of the current vehicle parameter values exceeds its corresponding threshold as determined at the step 410, the second data analysis and storage state, described as the suspended state, is entered. Entry into this state is indicated by setting the trigger status to "conditionally true" at a step 412.

Next, or if no vehicle parameter is determined to exceeds its corresponding threshold at the step 410, the trigger status is examined at a next step 414. If the trigger status is "invalid" as determined at the step 414, then the current state is the "active" data analysis and logging state in which data is periodically logged and trigger conditions periodically examined, and accordingly a trigger event timer is reset at a next step 416. After resetting the trigger event timer, which indicates that no trigger condition has been detected, the operations of FIG. 4 are concluded by returning, via a next step 430, to continue execution of the operations of the routine of FIG. 2.

Returning to step 414, if trigger status is not "invalid," then the three state trigger status is analyzed at a next step 418 to determine if it is "valid," indicating that the current state is the "terminated" state. If the trigger status is determined to be "valid" at the step 418, the operations of the routine of FIG. 4 are concluded, and the described step 430 is next carried out. If the trigger status is determined at the step 418 to not be "valid," then the trigger status must be "conditionally true," corresponding to the suspended data storage and analysis state, and conditions are then examined to determine if confirmation can be made that the trigger status is indeed "valid," providing that the stored data should be preserved in more permanent memory, as described.

More specifically, if trigger status is not "valid" at the step 418, a step 420 is next executed to determine if an electronic throttle control (ETC) system fault has been detected. If so, the trigger flag is next set to valid at a next step 422. The ETC fault may be any fault condition related to the ETC system which is conventionally detectable and which could impact ETC system performance. If such a fault condition is detected, a second indication of a condition (beyond the condition detected at the described step 410) requiring transfer of stored data to more permanent memory in accord with the principles of this invention has been detected.

Accordingly, the permanent data storage condition is confirmed and the terminated state is entered by proceeding from the step 420 to the step 422 to set trigger status to "valid" to mark operation in the third data storage and analysis state (the terminated state). After the step 422, data stored in RAM at the described step 308 may immediately be transferred, such as on an "entry by entry" basis into more permanent memory such as electronically-erasable programmable read only memory EEPROM, for example at a next step 421 (not shown) simply by storing each entry into the reserved RAM 48 (FIG. 1) into a corresponding position reserved in EEPROM 46 (FIG. 1). Alternatively, the data may be transferred from RAM 48 (FIG. 1) into flash memory, for example at the end of a vehicle ignition cycle, as will be described. After step 422, more data may be gathered and stored in RAM 48 via the steps of FIG. 3, by setting trigger status back to "invalid" to return to the active data storage and analysis state at a step following the step 421. However, in this embodiment, the first state is not resumed following the step 422 until the next vehicle ignition cycle. Next, and after any additional operations that may be required at the described step 421, the described step 430 is executed to conclude the operations of the routine of FIG. 4.

Returning to the step 420, if an ETC fault is not determined to be present, further conditions are analyzed at a next step 424. More specifically, if engine speed RPM is substantially zero, as determined at the step 424 indicating engine operation is terminated, the described step 422 is executed to enter the terminated state to provide for transfer of the parameter data from volatile to more permanent, as described.

Generally, if engine speed is substantially zero following occurrence of one of the trigger conditions analyzed at the described step 410, it is assumed that the vehicle parameter data stored in RAM at the step 308 may be useful in analyzing vehicle operation in accord with the principles of this invention, so the third (terminated) state is entered. However, if engine speed is not substantially zero at the step 424, then further conditions are analyzed at a next step 426.

Specifically, if a predetermined period of time has elapsed since the trigger timer was last reset at the described step 416, wherein the predetermined period of time may be determined through a conventional calibration procedure and is set to about thirty seconds in this embodiment, then too much time has elapsed in the second (suspended) state without any confirmation that the trigger event detected to be present at the step 410 was a valid trigger event, i.e. was followed by a detected fault condition or was followed by an engine shutdown, to assume the trigger was valid. Accordingly, the trigger is assumed to be a false trigger, and the state is switched back to "active" (corresponding to trigger flag set to "invalid") so that more data may be logged while waiting for any valid trigger event.

Specifically, if thirty seconds have elapsed while the trigger status is "conditionally true," then trigger status is next set to "invalid" at a step 428 signaling re-entry into the active data storage and analysis state and then the described step 430 is executed. If thirty seconds have not elapsed since the trigger flag was last reset at the step 416, then the operations proceed directly from the step 426 to the step 430. Upon executing the described step 430, the operations resume at step 212 of the routine of FIG. 2, to return to any prior operations, such as background diagnostic or maintenance operations in accordance with conventional powertrain control.

Figure 5:
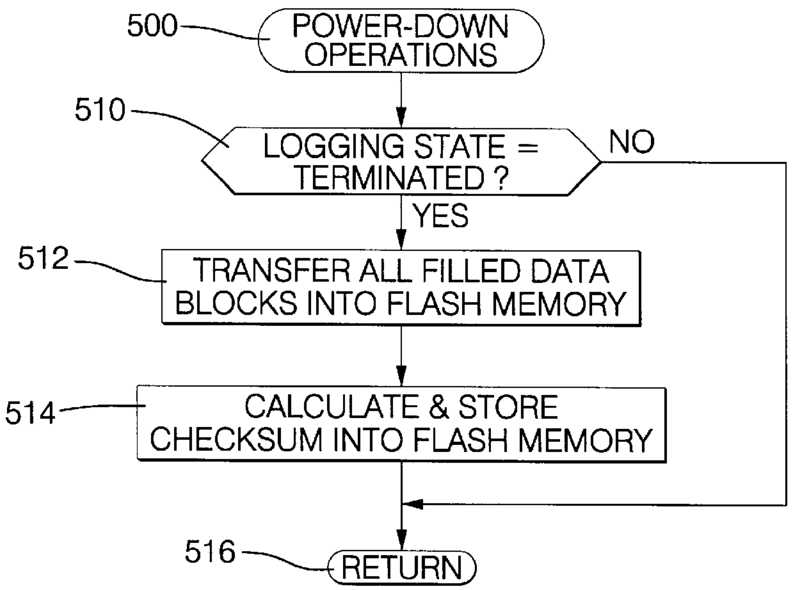

Referring to FIG. 5, PCM power-down operations are illustrated in a step by step manner, beginning at a step 500. Such operations may be executed following a vehicle operator-initiated power down operation, or following any other powertrain power down procedure in which the PCM is to be disabled and engine speed reduced to zero. The operations proceed from the step 500 to a next step 510 at which the trigger status is analyzed.

If the trigger status is "valid," all filled data blocks in the reserved portion of RAM 48 (FIG. 1) are transferred, using any conventional memory transfer procedure, to a corresponding block of flash memory at a next step 512. A checksum is next calculated in any conventional manner, such as by adding all transferred data values together and storing the least significant byte of the sum of such values in flash memory as the last entry thereof, for conventionally understood data security benefits. The stored data then is substantially insensitive to the loss of power to the PCM 36 of FIG. 1 and remains available for off-line analysis to establish the operating condition of the vehicle prior to the detection of an ETC fault or prior to engine shut down to substantially zero engine speed, or indeed prior to occurrence of any other vehicle operating condition that may tend to confirm the trigger condition.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. A multi-state automotive vehicle data storage and analysis method, comprising the steps of:

in a first state, (a) periodically sampling input :signal values indicating vehicle operating parameter values, (b) storing the sampled values in a temporary storage device, (c) determining a current vehicle operating condition, (d) comparing the current vehicle operating condition to a threshold operating condition, and (e) suspending operation in the first state by activating a second state when the current vehicle operating condition exceeds the threshold operating condition;

in the second state, (f) detecting occurrence of a predetermined confirmation condition, (g) suspending operation in the second state by activating a third state upon detecting occurrence of the predetermined confirmation condition; and in the third state, transferring the stored values from the temporary storage device to a permanent storage device.

2. The method of claim 1, wherein the current vehicle operating condition is a current time rate of change in vehicle speed.

3. The method of claim 2, wherein the threshold operating condition is a threshold time rate of change in vehicle speed, the method further comprising, in the first state, the step of:

generating the threshold time rate of change in vehicle speed as a predetermined function of a predetermined operating parameter.

4. The method of claim 3, wherein the predetermined operating parameter is a sensed degree of depression of an accelerator pedal.

5. The method of claim 3, wherein the predetermined operating parameter is vehicle speed.

6. The method of claim 1, wherein the current vehicle operating condition is a current position of an intake air valve for restricting passage of intake air into an engine of the vehicle.

7. The method of claim 6, wherein the threshold operating condition is a threshold position of the intake air valve, the method further comprising, in the first state, the step of:

generating the threshold position of the intake air valve as a predetermined function of a predetermined operating parameter.

8. The method of claim 7, wherein the predetermined operating parameter is a sensed degree of depression of an accelerator pedal.

9. The method of claim 1, wherein the predetermined confirmation condition is fault condition in a predetermined vehicle control system.

10. The method of claim 1, wherein the predetermined confirmation condition is a vehicle shutdown condition.

11. The method of claim 1, further comprising, in the second state, the steps of:

maintaining a time value indicating the time during which the second state is activated;

comparing the time value to a time limit; and suspending operating in the second state by activating the first state when the time value exceeds the time limit.

12. The method of claim 1, further comprising the step of:

starting a vehicle operating cycle; and activating the first state upon starting the vehicle operating cycle.

13. The method of claim 1, wherein the temporary storage device is a random access memory device and wherein the permanent storage device is a programmable-erasable read only memory device.

14. The method of claim 1, wherein the temporary storage device is a random access memory device and wherein the permanent storage device is a flash memory device.

* * * * *